US011560236B2

(12) United States Patent
Hamel et al.

(10) Patent No.: US 11,560,236 B2
(45) Date of Patent: Jan. 24, 2023

(54) SYSTEM AND METHOD FOR CONTROLLING A TAKEOFF THRUST

(71) Applicant: C SERIES AIRCRAFT LIMITED PARTNERSHIP, Mirabel (CA)

(72) Inventors: Remi Hamel, Laval (CA); Joel Boudreault, Laval (CA); Derik Del Castillo, Dorval (CA); Eva Perout, Montreal (CA); Francis Meunier, Montreal (CA); Tony Spinelli, Dorval (CA); Nicolas Tamestit, Montreal (CA); Olivier Lebegue, Outremont (CA); Christophe Nouhaud, Montreal (CA)

(73) Assignee: C SERIES AIRCRAFT LIMITED PARTNERSHIP, Mirabel (CA)

( * ) Notice: Subject to any disclaimer, the term of this patent is extended or adjusted under 35 U.S.C. 154(b) by 357 days.

(21) Appl. No.: 16/622,707

(22) PCT Filed: Jun. 30, 2017

(86) PCT No.: PCT/IB2017/053985
§ 371 (c)(1),
(2) Date: Dec. 13, 2019

(87) PCT Pub. No.: WO2019/002925
PCT Pub. Date: Jan. 3, 2019

(65) Prior Publication Data
US 2021/0139156 A1 May 13, 2021

(51) Int. Cl.
*B64D 31/06* (2006.01)
*F02C 9/28* (2006.01)
*F02C 9/44* (2006.01)

(52) U.S. Cl.
CPC ............... *B64D 31/06* (2013.01); *F02C 9/28* (2013.01); *F02C 9/44* (2013.01); *F05D 2270/051* (2013.01)

(58) Field of Classification Search
CPC . B64D 31/00; B64D 31/06; F02C 9/26; F02C 9/28; F02C 9/44; F02C 9/48; G05D 1/0083; G05D 1/0088; F05D 2270/051
See application file for complete search history.

(56) References Cited

U.S. PATENT DOCUMENTS 4,638,437 A    1/1987  Clearly et al.
4,837,695 A *  6/1989  Baldwin .............. G05D 1/0083
                                                    702/182

(Continued)

OTHER PUBLICATIONS

International Search Report and Written Opinion issued in PCT application No. PCT/IB2017/053985.

*Primary Examiner* — Alain Chau
(74) *Attorney, Agent, or Firm* — Norton Rose Fulbright Canada LLP

(57) ABSTRACT

The present disclosure provides systems and methods for controlling thrust produced at takeoff by at least one engine (114, 116) of an aircraft (100). At least one input signal comprising input data indicative of a speed of the aircraft is received (202). The speed of the aircraft is compared to a first pre-determined threshold. Responsive to determining that the speed is below the first threshold, a thrust limit for the at least one engine is determined (204) from the input data and output to the at least one engine a thrust limitation signal for causing the thrust to be limited according to the thrust limit (210).

18 Claims, 14 Drawing Sheets

(56) References Cited

U.S. PATENT DOCUMENTS

| | | | |
|---|---|---|---|
| 6,880,784 B1 | 4/2005 | Wilkinson et al. | |
| 8,615,335 B2* | 12/2013 | Couey | F02C 9/28 |
| | | | 244/188 |
| 9,828,869 B2* | 11/2017 | Bacic | F01D 11/14 |
| 10,049,586 B2* | 8/2018 | Gallo Olalla | G05D 1/0005 |
| 10,279,918 B2* | 5/2019 | Jackowski | B64D 43/00 |
| 10,293,951 B2* | 5/2019 | Feulner | G05D 1/0661 |
| 2008/0029653 A1 | 2/2008 | Johnson | |
| 2009/0132107 A1 | 5/2009 | DeJonge | |
| 2010/0070112 A1 | 3/2010 | Couey et al. | |
| 2013/0211636 A1 | 8/2013 | Martins et al. | |
| 2015/0159499 A1* | 6/2015 | Bacic | F01D 11/20 |
| | | | 700/287 |
| 2016/0260333 A1* | 9/2016 | Gallo Olalla | B64D 31/06 |
| 2017/0152054 A1* | 6/2017 | Consola | B64D 31/06 |
| 2017/0267366 A1* | 9/2017 | Feulner | B64D 31/12 |
| 2018/0057184 A1* | 3/2018 | Jackowski | B64D 43/00 |
| 2019/0031358 A1* | 1/2019 | Sobanski | F02C 6/20 |

* cited by examiner

SYSTEM AND METHOD FOR CONTROLLING A TAKEOFF THRUST

The present application is a national phase application under 35 U.S.C. 371 of International Patent Application No. PCT/IB2017/053985 filed on Jun. 30, 2017, the entire content of which is incorporated herein by reference.

TECHNICAL FIELD

The present disclosure relates generally to aircraft controls, and more specifically to controlling a takeoff thrust produced by an aircraft engine at low speed.

BACKGROUND

When an aircraft is operating at low speed, the elevator typically has no authority or power due to the low level or the absence of dynamic pressure. For a given aircraft weight and center of gravity, the aircraft engine creates a moment that causes the nose landing gear to be unloaded, which in turn compromises the aircraft's steering capability. Solutions have been proposed to overcome this problem. Existing solutions however result in a takeoff performance penalty due to a lower thrust level at start of takeoff in addition to increasing system complexity.

As such, there is a need for an improved system and method for controlling a takeoff thrust produced by an aircraft engine at low speed.

SUMMARY

The present disclosure provides methods and systems for controlling a thrust produced at takeoff by an aircraft engine.

In accordance with a broad aspect, there is provided a method for controlling a thrust produced at takeoff by at least one engine of an aircraft, the method comprising receiving at least one input signal comprising input data indicative of a speed of the aircraft, comparing the speed of the aircraft to a first predetermined threshold, and responsive to determining that the speed is below the first threshold, determining from the input data a thrust limit for the at least one engine and outputting to the at least one engine a thrust limitation signal for causing the thrust to be limited according to the thrust limit.

In some embodiments, receiving the at least one input signal comprises receiving from a speed probe a speed signal indicative of one of a calibrated airspeed, a true airspeed, and a ground speed of the aircraft.

In some embodiments, the method further comprises comparing the one of the calibrated airspeed, the true airspeed, and the ground speed to a second predetermined threshold and setting the one of the calibrated airspeed, the true airspeed, and the ground speed as the speed of the aircraft responsive to determining that the one of the calibrated airspeed, the true airspeed, and the ground speed is above the second threshold.

In some embodiments, receiving the at least one input signal comprises receiving from a wheel speed sensor a wheel speed signal indicative of a wheel speed for the aircraft, the method further comprising, responsive to determining that the one of the calibrated airspeed, the true airspeed, and the ground speed is below the second threshold, computing an estimated speed of the aircraft on the basis of the wheel speed and setting the estimated speed as the speed of the aircraft.

In some embodiments, the wheel speed signal is received as comprising a plurality of wheel speed values and computing the estimated speed comprises determining a valid wheel speed value among the plurality of wheel speed values and computing a sum of the valid wheel speed value and a wind adjustment value.

In some embodiments, receiving the at least one input signal comprises receiving an indication of a type of the aircraft, a measurement of an ambient temperature, and a measurement of an ambient pressure and determining the thrust limit comprises selecting a lowest one of a commanded takeoff thrust value and a predetermined thrust limitation value selected from a table providing thrust as a function of at least one of the speed of the aircraft, the type of the aircraft, the ambient temperature, and the ambient pressure.

In some embodiments, receiving the at least one input signal comprises receiving an indication of a type of the aircraft, a measurement of an ambient temperature, and a measurement of an ambient pressure and determining the thrust limit comprises comparing the speed of the aircraft to a second predetermined threshold, responsive to determining that the aircraft speed is above the threshold, setting as the thrust limit a first predetermined thrust limitation value, the first thrust limitation value associated with the speed of the aircraft and selected from a table providing thrust as a function of at least one of the speed of the aircraft, the type of the aircraft, the ambient temperature, and the ambient pressure, and responsive to determining that the aircraft speed is below the threshold, setting as the thrust limit a lowest value among the first thrust limitation value and a thrust value selected from a linear ramp defined from a lowest thrust value at static to a maximum takeoff thrust reference at the second threshold, the lowest thrust value at static corresponding to a minimum value among a maximum allowable static thrust, a maximum takeoff thrust reference at zero knots, and a second predetermined thrust limitation value, the second thrust limitation value selected from the table and associated with a speed of zero knots.

In some embodiments, comparing the speed of the aircraft to the first threshold comprises comparing the speed to 80 knots and comparing the speed of the aircraft to the second threshold comprises comparing the speed to 50 knots.

In some embodiments, the method further comprises disabling the thrust limitation signal from being output to the at least one engine responsive to determining that the current speed is above the first threshold.

In some embodiments, the at least one input signal is indicative of whether the aircraft is on ground, the method further comprising disabling the thrust limitation signal from being output to the at least one engine responsive to determining from the at least input signal that the aircraft is not on ground.

In some embodiments, the method further comprises disabling the thrust limitation signal from being output to the at least one engine responsive to determining that the at least input signal is invalid.

In some embodiments, the at least one input signal is indicative of at least one of a weight of the aircraft, a center of gravity of the aircraft, a wind amplitude, and a wind direction, the method further comprising disabling the thrust limitation signal from being output to the at least one engine or modulating the thrust limitation signal responsive to determining that at least one of the weight of the aircraft, the center of gravity of the aircraft, the wind amplitude, and the wind direction exceeds a predetermined tolerance.

According to another broad aspect, there is provided a system for controlling a thrust produced at takeoff by at least one engine of an aircraft, the system comprising a processing unit, and a non-transitory computer-readable memory having stored thereon program instructions executable by the processing unit for receiving at least one input signal comprising input data indicative of a speed of the aircraft, comparing the speed of the aircraft to a first predetermined threshold, and responsive to determining that the speed is below the first threshold, determining from the input data a thrust limit for the at least one engine and outputting to the at least one engine a thrust limitation signal for causing the thrust to be limited according to the thrust limit.

In some embodiments, the program instructions are executable by the processing unit for receiving the at least one input signal comprising receiving from n speed probe a speed signal indicative of one of a calibrated airspeed, a true airspeed, and a ground speed of the aircraft.

In some embodiments, the program instructions are executable by the processing unit for comparing the one of the calibrated airspeed, the true airspeed, and the ground speed to a second predetermined threshold and setting the one of the calibrated airspeed, the true airspeed, and the ground speed as the speed of the aircraft responsive to determining that the one of the calibrated airspeed, the true airspeed, and the ground speed is above the second threshold.

In some embodiments, the program instructions are executable by the processing unit for receiving the at least one input signal comprising receiving from a wheel speed sensor a wheel speed signal indicative of a wheel speed for the aircraft and for, responsive to determining that the one of the calibrated airspeed, the true airspeed, and the ground speed is below the second threshold, computing an estimated speed of the aircraft on the basis of the wheel speed and setting the estimated speed as the speed of the aircraft.

In some embodiments, the program instructions are executable by the processing unit for receiving the wheel speed signal comprising a plurality of wheel speed values and for computing the estimated speed comprising determining a valid wheel speed value among the plurality of wheel speed values and computing a sum of the valid wheel speed value and a wind adjustment value.

In some embodiments, the program instructions are executable by the processing unit for receiving the at least one input signal comprising receiving an indication of a type of the aircraft, a measurement of an ambient temperature, and a measurement of an ambient pressure and for determining the thrust limit comprising selecting a lowest one of a commanded takeoff thrust value and a predetermined thrust limitation value selected from a table providing thrust as a function of at least one of the speed of the aircraft, the type of the aircraft, the ambient temperature, and the ambient pressure.

In some embodiments, the program instructions are executable by the processing unit for receiving the at least one input signal comprising receiving an indication of a type of the aircraft, a measurement of an ambient temperature, and a measurement of an ambient pressure and for determining the thrust limit comprising comparing the speed of the aircraft to a second predetermined threshold, responsive to determining that the aircraft speed is above the threshold, setting as the thrust limit a first predetermined thrust limitation value, the first thrust limitation value associated with the speed of the aircraft and selected from a table providing thrust as a function of at least one of the speed of the aircraft, the type of the aircraft, the ambient temperature, and the ambient pressure, and responsive to determining that the aircraft speed is below the threshold, setting as the thrust limit a lowest value among the first thrust limitation value and a thrust value selected from a linear ramp defined from a lowest thrust value at static to a maximum takeoff thrust reference at the second threshold, the lowest thrust value at static corresponding to a minimum value among a maximum allowable static thrust, a maximum takeoff thrust reference at zero knots, and a second predetermined thrust limitation value, the second thrust limitation value selected from the table and associated with a speed of zero knots.

In some embodiments, the program instructions are executable by the processing unit for comparing the speed of the aircraft to the first threshold comprising comparing the speed to 80 knots and for comparing the speed of the aircraft to the second threshold comprising comparing the speed to 50 knots.

In some embodiments, the program instructions are executable by the processing unit for disabling the thrust limitation signal from being output to the at least one engine responsive to determining that the current speed is above the first threshold.

In some embodiments, the program instructions are executable by the processing unit for receiving the at least one input signal indicative of whether the aircraft is on ground and for disabling the thrust limitation signal from being output to the at least one engine responsive to determining from the at least input signal that the aircraft is not on ground.

In some embodiments, the program instructions are executable by the processing unit for disabling the thrust limitation signal from being output to the at least one engine responsive to determining that the at least input signal is invalid.

In some embodiments, the program instructions are executable by the processing unit for receiving the at least one input signal indicative of at least one of a weight of the aircraft, a center of gravity of the aircraft, a wind amplitude, and a wind direction and for disabling the thrust limitation signal from being output to the at least one engine or modulating the thrust limitation signal responsive to determining that at least one of the weight of the aircraft, the center of gravity of the aircraft, the wind amplitude, and the wind direction exceeds a predetermined tolerance.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Figure 1:
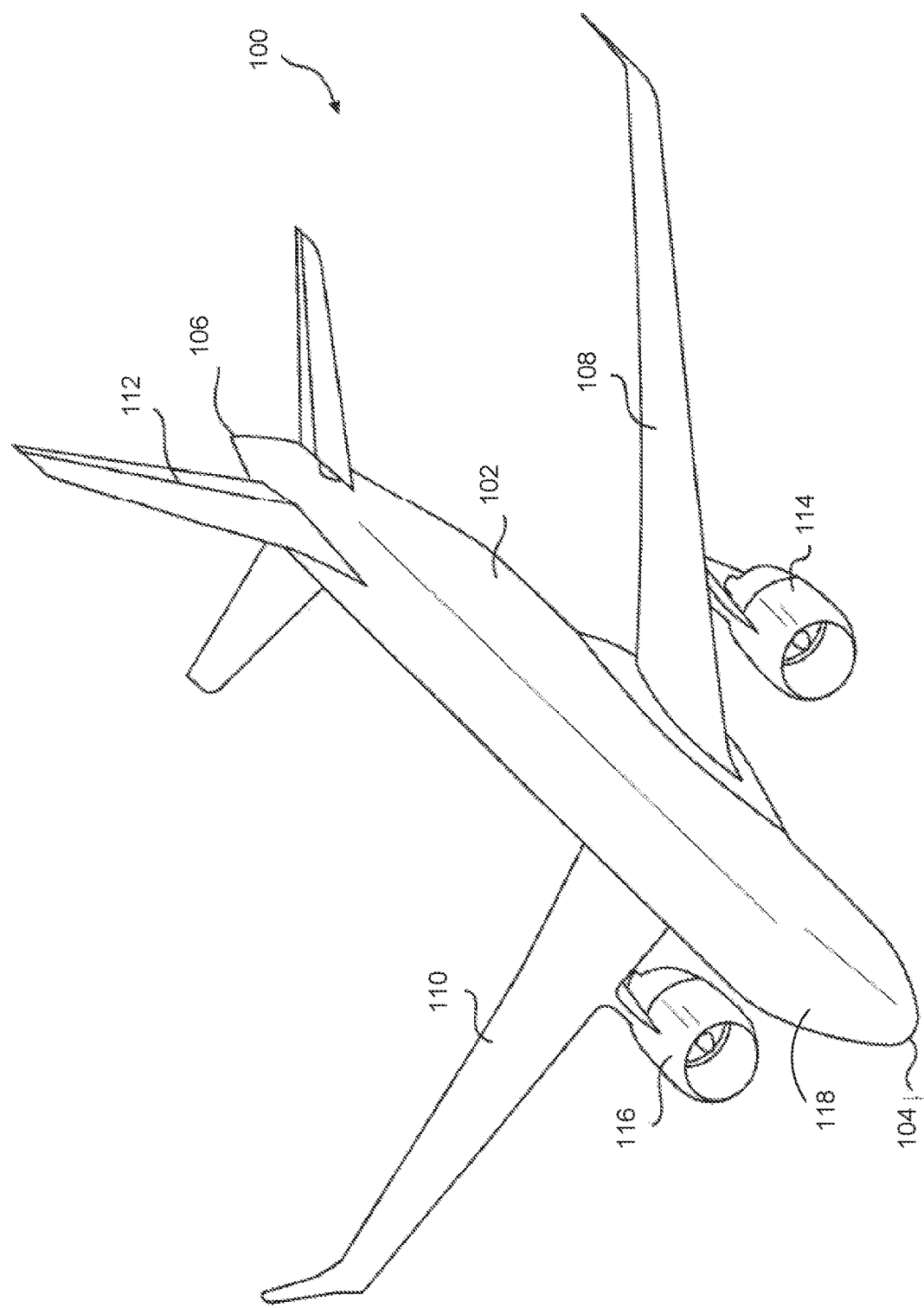
FIG. 1 is a perspective illustration of an aircraft, in accordance with one embodiment.

With reference to FIG. 1, a perspective illustration of an aircraft 100 in accordance with one embodiment will now be described. The aircraft 100 comprises a fuselage 102 longitudinally defining a forward end 104 and a rear (or aft) end 106. Two wings 108, 110 extend laterally from the fuselage 102. A tail section 112 (or empennage) is attached to the rear end 106 of the aircraft 100. As should be apparent to those skilled in the art, the wings 108, 110 and the tail section 112 incorporate multiple control surfaces that are responsible for the flying characteristics and operation of the aircraft 100. Two powerplants 114, 116 (also referred to as "underwing engines" 114, 116 herein) are suspended from and connect to the wings 108, 110, as illustrated. It should however be understood that the aircraft 100 may comprise any other suitable number and/or configuration of engines 114, 116. For example, the aircraft 100 may comprise four underwing engines as in 114, 116. The aircraft 100 may also comprise two underwing engines 114, 116 and one engine (not shown) mounted to the tail section 112. Other embodiments may apply.

Each engine 114, 116 may be controlled by an Electronic Engine Control (EEC), not shown. The EEC may be part of a Full Authority Digital Engine Control (FADEC, not shown) used to manage operation of the engines 114, 116 by modulating fuel flow thereto, thereby controlling the engines 114, 116 through acceleration, deceleration, and steady state operation. The FADEC may further schedule and control surge protection systems, protect the engines 114, 116 from overspeed and overtemperature, as well as perform complete engine start control.

In one embodiment, the fuselage 102 is a composite fuselage which can be made from one or more composite materials, including fiberglass, carbon fiber, polymers, glass, and the like. In certain embodiments, the fuselage 102 is made of a plurality of layers of composite materials. In another embodiment, the fuselage 102 is made of an aluminum-lithium alloy. Other embodiments may apply.

The aircraft 100 can be any type of aircraft, including propeller planes, jet planes, turbojet planes, turbo-propeller planes, turboshaft planes, and the like. A cockpit 118 may be positioned at any suitable location on the aircraft 100, for example at a front portion of the fuselage 102. The cockpit 118 is configured for accommodating one or more pilots who control the aircraft 100 by way of one or more operator controls (not illustrated). The operator controls may include any suitable number of pedals, yokes, steering wheels, centre sticks, flight sticks, levers, knobs, switches, and the like.

Figure 2:
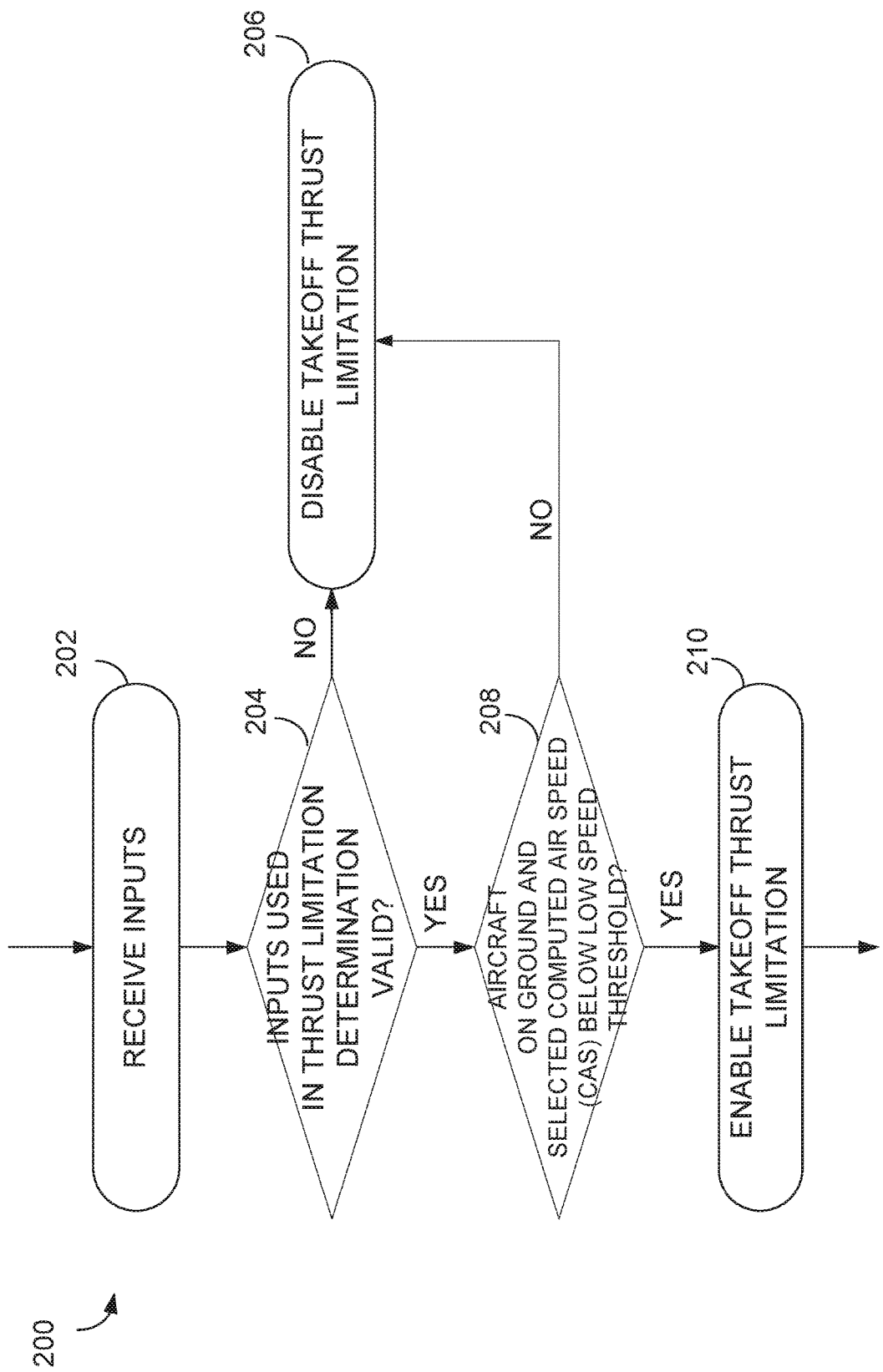
FIG. 2 is a flowchart of an example method for controlling a takeoff thrust of an aircraft, in accordance with one embodiment.

Referring now to FIG. 2, a method 200 for controlling a takeoff thrust of an aircraft, such as the aircraft 100 of FIG. 1, will now be described. As will be discussed further below, the method 200 is illustratively implemented in the FADEC. The method 200 is used to limit the takeoff thrust at low airspeeds, thereby allowing to comply with a minimum nose landing gear (NLG) load requirement in the takeoff phase (e.g. for steering capability). In one embodiment, the methods and systems described herein allow, for example, to minimize crew workload during takeoff and ensure aircraft controllability at low speed during takeoff, in addition to optimizing engine performance. As used herein, the term "takeoff thrust limit" refers to the level of thrust not to be exceeded by a given engine (i.e. the maximum allowable takeoff thrust) with the engine providing the highest thrust at a given engine control parameter. In one embodiment, the engine control parameter is the rotational speed of the low pressure, or low speed, engine spool (N1). In another embodiment, the engine control parameter is the engine pressure ratio (EPR). Other embodiments may apply.

The illustrated method 200 comprises receiving at takeoff (e.g. over Aeronautical Radio INC. (ARINC)) inputs from one or more aircraft sensors, one or more engine sensors, and/or the pilot (step 202). The received inputs may include, but are not limited to, an identification of the aircraft type or model (e.g. determined from the aircraft model bit from the avionics system), measurement signal(s) received from one or more speed sensors (e.g. an air data smart probe (ADSP), a wheel speed sensor, and the like) and indicative of a speed of the aircraft, measurement signal(s) received from one or more temperature sensors and indicative of an ambient (or outside) air temperature, measurement signal(s) received from one or more pressure sensors and indicative of ambient pressure, and measurement signal(s) indicative of whether the aircraft is on the ground or in flight.

The next step 204 is then to determine whether the inputs (e.g. aircraft type, aircraft speed, ambient temperature, ambient pressure or pressure-altitude) used in the takeoff thrust limitation determination have been received and are valid. If it is determined at step 204 that the inputs are invalid (e.g. have not been received for a number of consecutive updates or are out of range), the takeoff thrust limitation is disabled at step 206 in the FADEC and this condition may be annunciated to the cockpit (e.g. over ARINC). As a result, no takeoff thrust limit is set and full thrust is made available for takeoff. Otherwise, the next step 208 is to determine from the inputs received at step 202 whether the aircraft is on the ground and whether the selected computed (or calibrated) airspeed (CAS) is below (e.g. lower than) a given low speed threshold. As used herein, the term "airspeed" refers to the speed of the aircraft relative to air and the term "low speed" refers to a speed below the given low speed threshold. In one embodiment, the given low speed threshold is 80 knots. It should however be understood that other thresholds may apply.

As used herein, the term "selected CAS" refers to the CAS value taken into consideration (e.g. by the thrust limitation logic implemented in the FADEC) to determine whether to enable or disable the takeoff thrust limitation. It should however be understood that the thrust limitation logic may also use true or equivalent airspeed, ground speed, or the like. The CAS indication received from the aircraft (e.g. from the ADSP) is used as the selected CAS if the aircraft CAS agrees with (e.g. corresponds to, within a given tolerance) a computed CAS calculated (e.g. on the basis of the CAS measurement(s) received from the ADSP) by the EEC. If the aircraft CAS does not correspond to the CAS computed by the EEC (referred to herein as the "actual CAS"), the thrust limitation logic gives preference to the EEC computed CAS, which is then used as the selected CAS. If it is determined at step 208 that the aircraft is not on the ground or the selected CAS is above (e.g. greater than or equal to) the low speed threshold, the method 200 flows back to the step 206 of disabling the takeoff thrust limitation. Otherwise, the method 200 flows to the step 210 of enabling the takeoff thrust limitation.

In one embodiment, the takeoff thrust limitation may be further disabled and full thrust made available for installed static thrust assurance testing purposes, as required for functional testing, return to service (e.g. maintenance) procedures, or the like. In one embodiment, once disabled, the takeoff thrust limitation is only re-enabled once the aircraft is on ground, the selected CAS is lower than the low speed threshold, or the FADEC is reset (e.g. during engine shutdown). In this manner, it can be ensure that the takeoff thrust limitation functionality is only activated once per flight.

Figure 3:
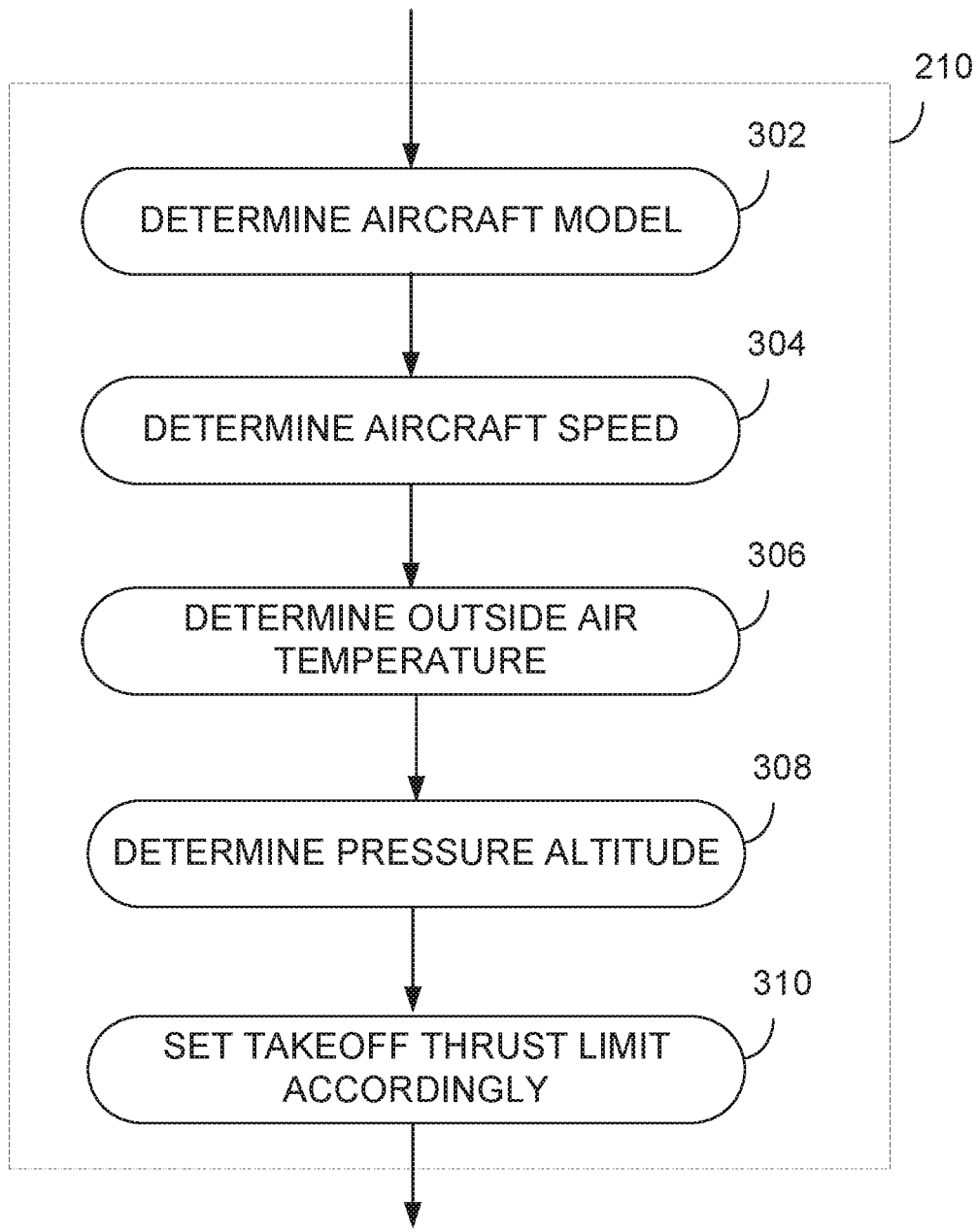
FIG. 3 is a flowchart of the step of FIG. 2 of enabling a takeoff thrust limitation, in accordance with one embodiment.

Referring now to FIG. 3, the step 210 of enabling the takeoff thrust limitation illustratively comprises using the inputs received at step 202 of FIG. 2 to determine the aircraft model (step 302), determine the most accurate value of the aircraft speed to be used in the selection of the maximum allowable takeoff thrust (step 304), determine the outside air temperature (step 306), and/or determine pressure altitude (step 308). The takeoff thrust limit is then set accordingly at step 310. It should be understood that the takeoff limitation may be enabled at step 210 on the basis of any suitable combination of inputs. In one embodiment, the takeoff thrust limit is applied by the FADEC to the thrust command (e.g. the N1 command), in such a way that the effect of the takeoff thrust limitation is only visible in the cockpit (e.g. in the N1 gauge) through a given indication used to display a thrust command cursor. In this embodiment, other cockpit indications do not reflect the takeoff thrust limitation and functionality is therefore not adversely affected.

Figure 4:
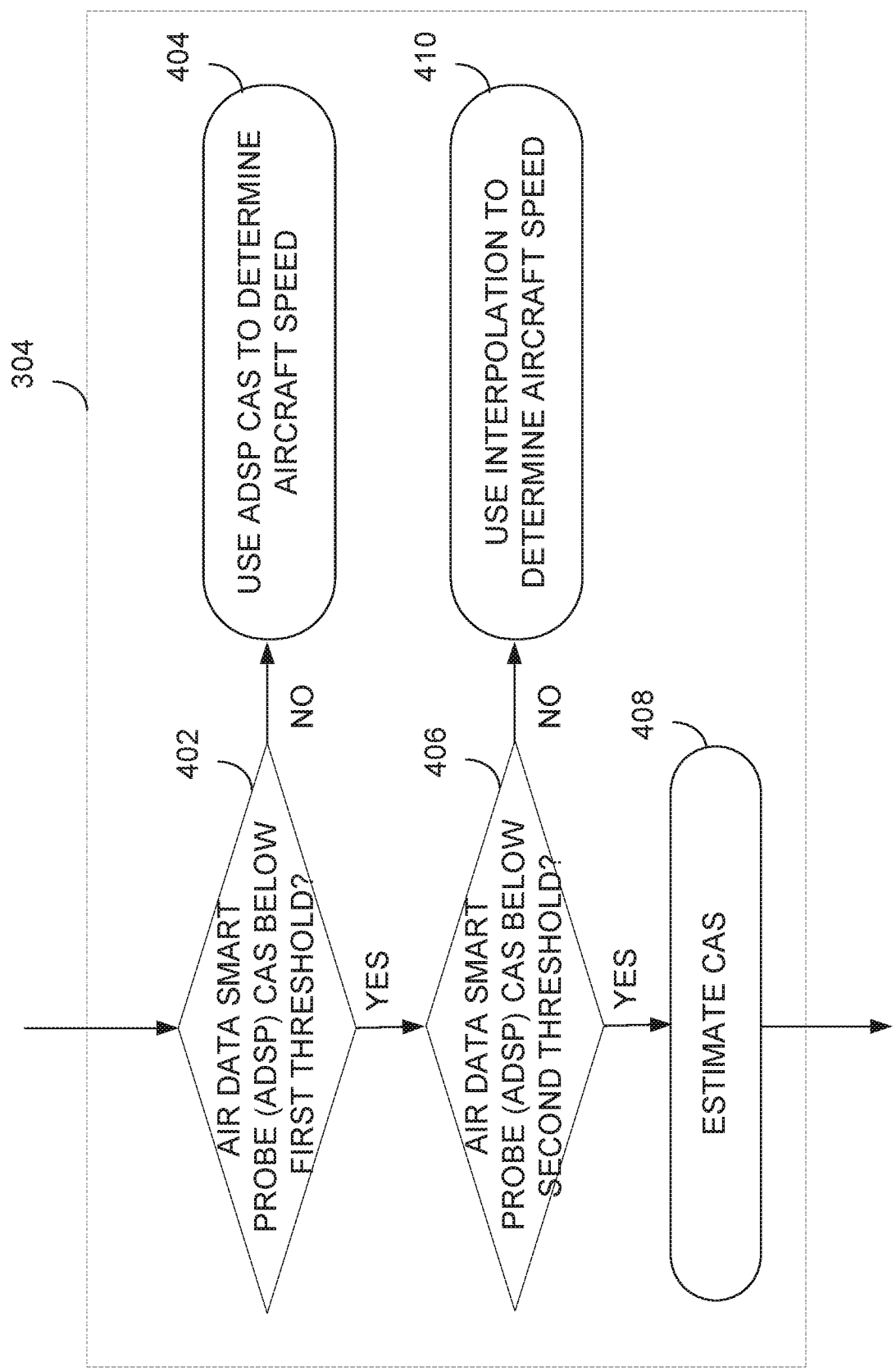
FIG. 4 is a flowchart of the step of FIG. 3 of determining aircraft speed, in accordance with one embodiment.

Referring now to FIG. 4, since the CAS received from the ADSP (received at step 202 of FIG. 2) may be invalid and/or unreliable below a given threshold, the step 304 of determining the aircraft speed comprises in one embodiment determining, at step 402, whether the ADSP CAS is below the given threshold. In one embodiment, the given threshold is 50 knots. It should however be understood that other embodiments (i.e. other thresholds) may apply depending for example on the aircraft configuration and requirements. If it is determined at step 402 that the ADSP CAS is above (e.g. greater than or equal to) the given threshold, the ADSP CAS is used to determine the aircraft speed as step 404. In other words, the ADSP CAS is set as the aircraft speed and the value of the ADSP CAS is used as an input to find the thrust limit value in the lookup table(s). Otherwise, if it is determined at step 402 that the ADSP CAS is below the given threshold, the next step 406 is to assess whether the ADSP CAS is below a second threshold. In one embodiment, the second threshold is 30 knots but it should be understood that other embodiments may apply. If the ADSP CAS is below the second threshold, an estimated CAS is computed at step 408. Otherwise, if the ADSP CAS is above the second threshold, an interpolation (e.g. linear, step change, quadratic, or any other suitable type of interpolation) between the estimated CAS and the ADSP CAS may be used, with the interpolation being governed by the estimated CAS. It should however be understood that steps 402 to 408 are optional and many be omitted in some embodiments.

Figure 5:
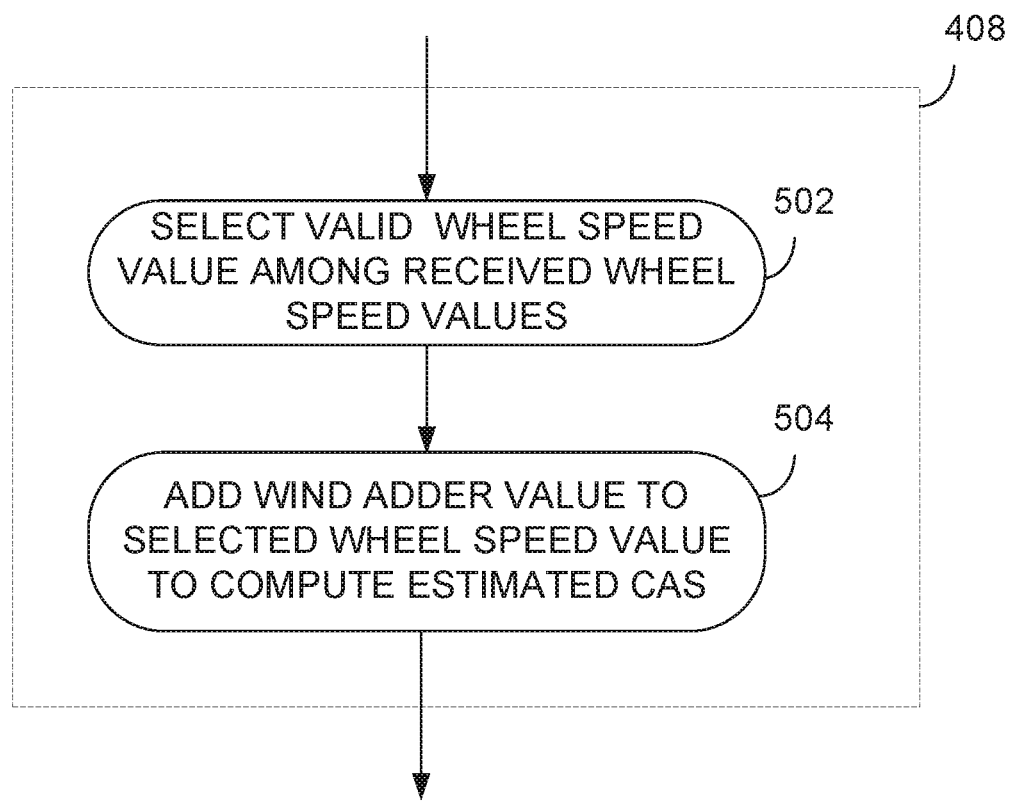
FIG. 5 is a flowchart of the step of FIG. 4 of estimating airspeed, in accordance with one embodiment.

Referring now to FIG. 5, the CAS is illustratively estimated at step 408 based on wheel speed. For this purpose, step 408 comprises selecting, at step 502, a valid wheel speed value among the wheel speed values received at step 202 of FIG. 2. In the embodiment illustrated in FIG. 5, a minimum valid wheel speed value is selected. It should however be understood that other embodiments may apply. For example, step 502 may comprise selecting a maximum valid wheel speed value or an average valid wheel speed value. A plurality of wheel speed indications may indeed be received and the valid wheel speed value is then selected in order to provide the most conservative estimate of wheel speed. A wheel speed value may for example be invalid if the corresponding label has even parity, the label is not received for a predetermined number (e.g. three) of consecutive updates, or the label is not in range. Although the estimated CAS is described and illustrated herein as being computed using aircraft wheel speed, it should be understood that the CAS may be estimated using any suitable engine measured parameter(s), including, but not limited to, total pressure, static/ambient pressure, and/or temperature. A variety of sources, including, but not limited to, sensing devices, speed from Global Positioning System (GPS) or inertial reference unit (IRU), may also be used to compute the estimated CAS.

The estimated CAS is then computed at step 504 as the sum of the valid wheel speed value (referred to herein as the "selected wheel speed") and a wind adjustment (referred to herein as "wind adder value"). The valid wheel speed value and the wind adder value, once added, represent true airspeed, and a predetermined correlation from true airspeed to CAS is then applied to convert the true airspeed to a CAS adjustment, as will be understood by one skilled in the art. In one embodiment, the wind adder value is a tail wind adder value, which takes into account a maximum tail wind (e.g. of 10 knots, 15 knots, or any other suitable value) and corrects for density altitude effects. In another embodiment, the wind adder value is a head wind adder value, which takes into account a maximum head wind. In particular, because the takeoff performance is a function of wind components, the wind adder value is used to ensure that the takeoff performance can be properly adjusted for operation in different wind scenarios. For example, for tailwinds greater than the maximum tail wind (e.g. greater than 10 knots), the FADEC may output a control signal comprising instructions to cause a crew procedure or aft center of gravity (CG) limitation to be implemented. In one embodiment, the wind adder value is determined by querying one or more lookup tables, using a pressure-altitude measurement, a DTISA (i.e. temperature deviation relative to standard atmospheric conditions) measurement, as well as the selected wheel speed as inputs. In one embodiment, each lookup table provides wind adder values as a function of pressure-altitude, temperature, and wheel speed. Although lookup tables are referred to herein, it should be understood that any other suitable data format may apply.

Figure 6:
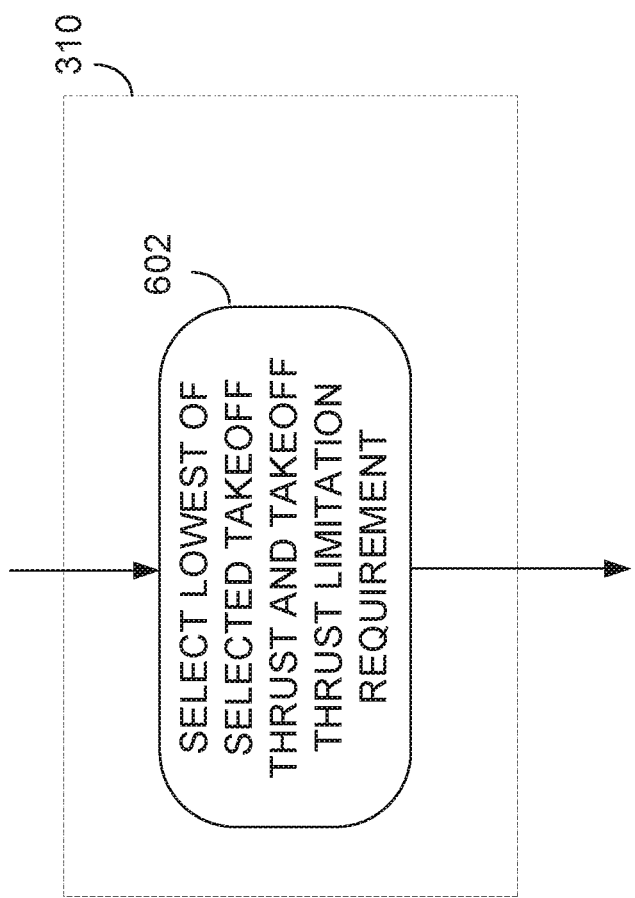
FIG. 6 is a flowchart of the step of FIG. 3 of setting a takeoff thrust limit, in accordance with a first embodiment.

Referring now to FIG. 6, in a first embodiment, the step 310 of setting the takeoff thrust limit comprises selecting, at each speed node, the lowest value between the selected takeoff thrust (as commanded by the pilot at takeoff) and a takeoff thrust limitation requirement determined by querying one or more lookup tables (step 602) and applying thrust accordingly. The one or more lookup tables are illustratively stored in memory and provide takeoff thrust limit values as a function of the type of the aircraft, the speed of the aircraft, the outside air temperature, and/or altitude/ambient pressure, are retrieved. The values found in the lookup tables may be derived based on simulation models designed to derive maximum thrust required to maintain load on the gear. The simulation models are illustratively real-time model representations of the aircraft configuration, aerodynamics, systems representation, weight and CG, engine performance transient, steady state performance, and the like. It should be understood that interpolation (e.g. linear or other suitable type of interpolation) may be performed between nodes upon querying the takeoff thrust limit lookup table(s). It should also be understood that, although lookup tables are referred to herein, any other suitable data format may apply.

Figure 7:
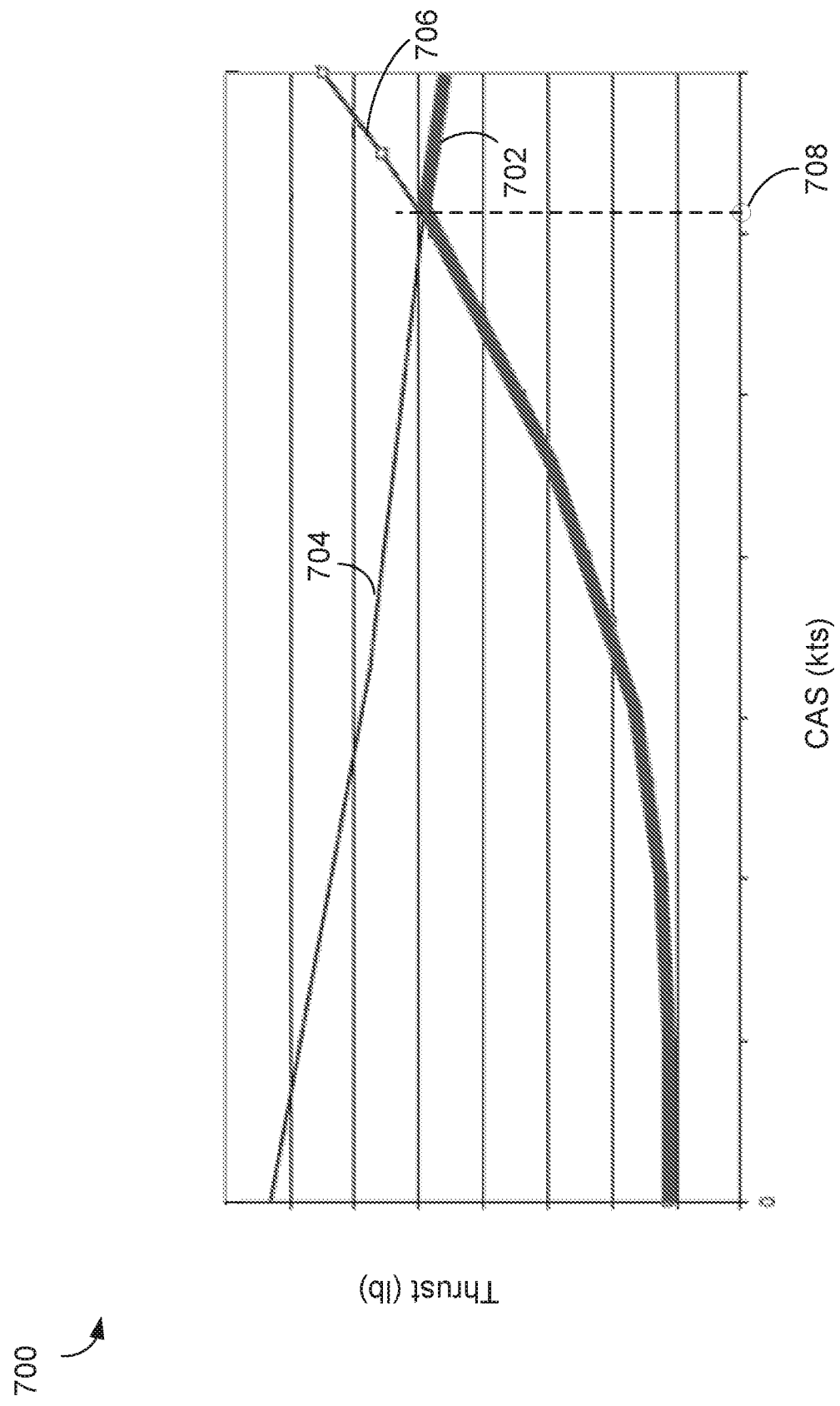
FIG. 7 illustrates an example graph of a limited takeoff thrust curve, in accordance with the embodiment of FIG. 6.

FIG. 7 illustrates an example graph 700 of a limited takeoff thrust curve 702 determined at each speed node (not shown) based on a selected takeoff thrust curve 704 and a thrust limitation requirement curve 606. As can be seen in FIG. 7, below a given CAS value 708 (about 62 knots in the illustrated example), the thrust limitation requirement curve 706 is below the selected takeoff thrust curve 704 and the limited takeoff thrust curve 702 therefore follows the thrust limitation requirement curve 706. Above, the CAS value 708, the selected takeoff thrust curve 704 is below the thrust limitation requirement curve 706 and the limited takeoff thrust curve 702 therefore follows the selected takeoff thrust curve 704.

Figure 8:
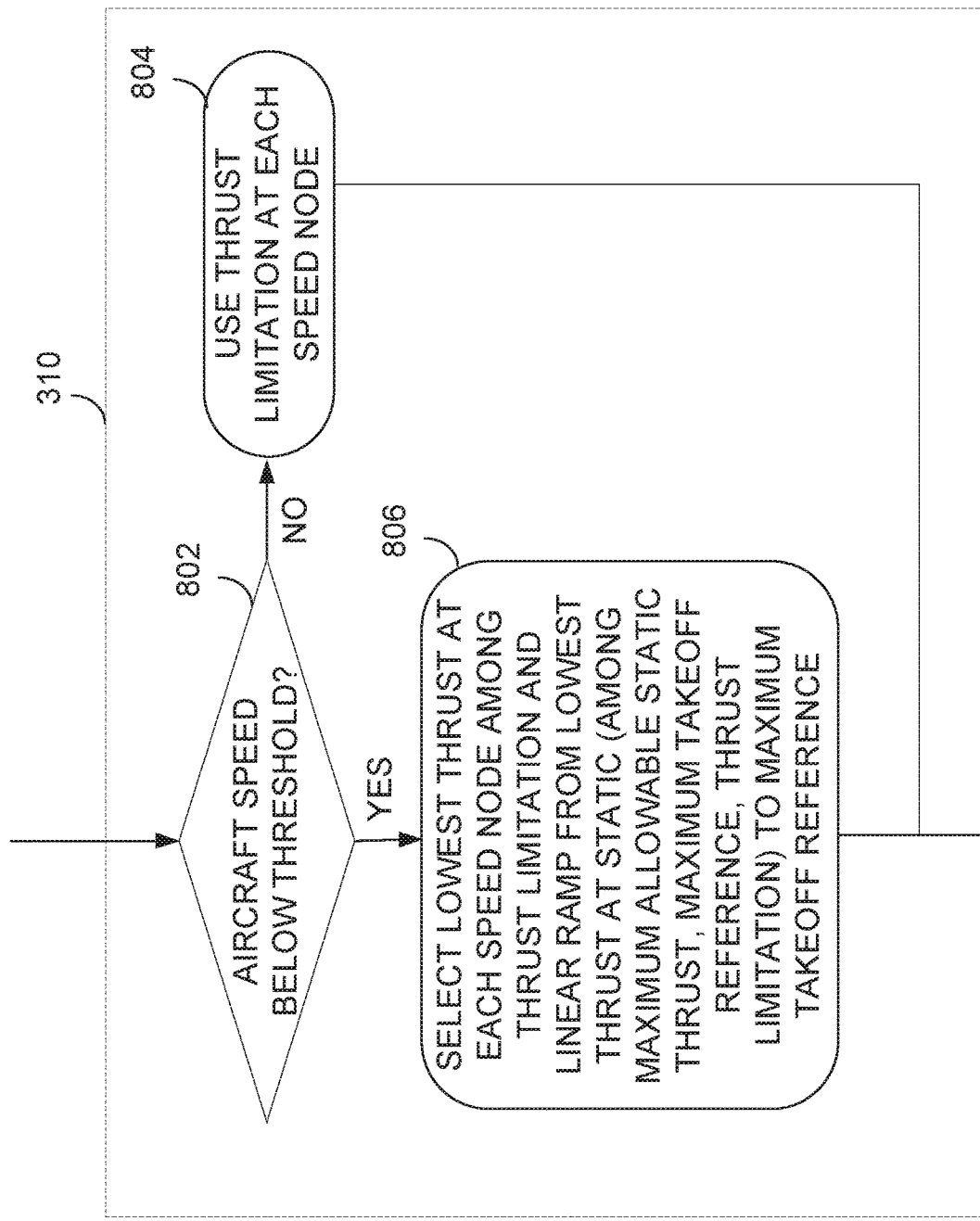
FIG. 8 is a flowchart of the step of FIG. 3 of setting a takeoff thrust limit, in accordance with a second embodiment.

Using the embodiment described above with reference to FIG. 6 and FIG. 7 does not cover tailwind operation or crosswind operation greater than given thresholds (e.g. tailwind operation greater than 10 knots or crosswind operation greater than 20 knots), therefore requiring a restricted (also referred to as rolling, tailwind, or crosswind procedure) takeoff procedure and timing the thrust lever angle (TLA) advance from a given value (e.g. 50% N1) to takeoff thrust (e.g. at 50 knots). Referring now to FIG. 8, in a second embodiment, the step 310 of setting the takeoff thrust limit comprises selecting the lowest thrust setting that would ensure sufficient NLG load is applied and the propulsion limitation for crosswind and tailwind is adhered to. In this manner, it becomes possible to allow, for example, to operate with auto-throttle engaged regardless of wind, tailwind or weight and CG conditions. This may be allowed with takeoff, reduced takeoff, and derated thrust takeoff. The takeoff procedure can therefore be simplified, and exposure to error in thrust setting during takeoff reduced, and overall takeoff performance optimized.

In the embodiment of FIG. 8, the step 310 illustratively comprises assessing at step 802 whether the aircraft speed (determined at step 304 of FIG. 3) is below (e.g. lower than or equal to) a given threshold (e.g. 50 knots). If this is not the case, the next step 804 is to use the thrust limitation requirement (e.g. determined upon querying the takeoff thrust limit tables discussed above) at each speed node. Otherwise, the next step 806 is to select the lowest thrust at each speed node among the thrust limitation requirement and a linear thrust increase (or ramp) which is defined from the lowest thrust at static to a maximum takeoff reference at the given threshold (e.g. 50 knots), the lowest thrust at static determined as the minimum between a thrust value at which it is undesirable for the engine to stabilize in order to limit the risk of engine limit (e.g. engine stall, surge, or stress) due to operation in high crosswind or tailwind and/or to remain within the engine fan blade stress limit (e.g. 83% N1 in one embodiment), the maximum takeoff reference at 0 knots, and the thrust limitation requirement (e.g. determined upon querying suitable lookup tables, as discussed above) at 0 knots. Step 806 is illustrated in FIG. 9A, FIG. 9B, and FIG. 9C.

Figure 9A:
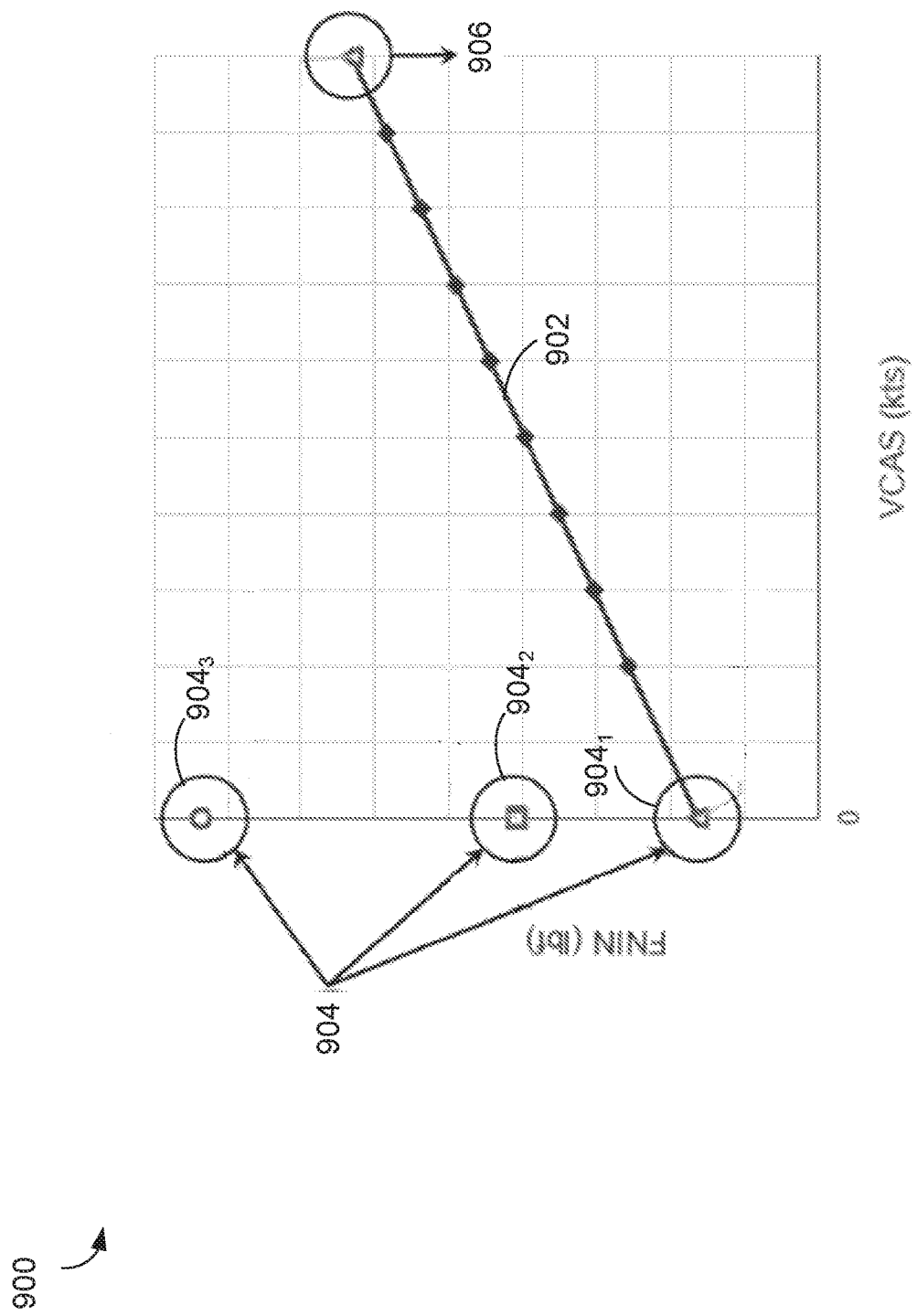
FIG. 9A is an example graph of a linear ramp used in determining the takeoff thrust limit, in accordance with the embodiment of FIG. 8.
Figure 9B:
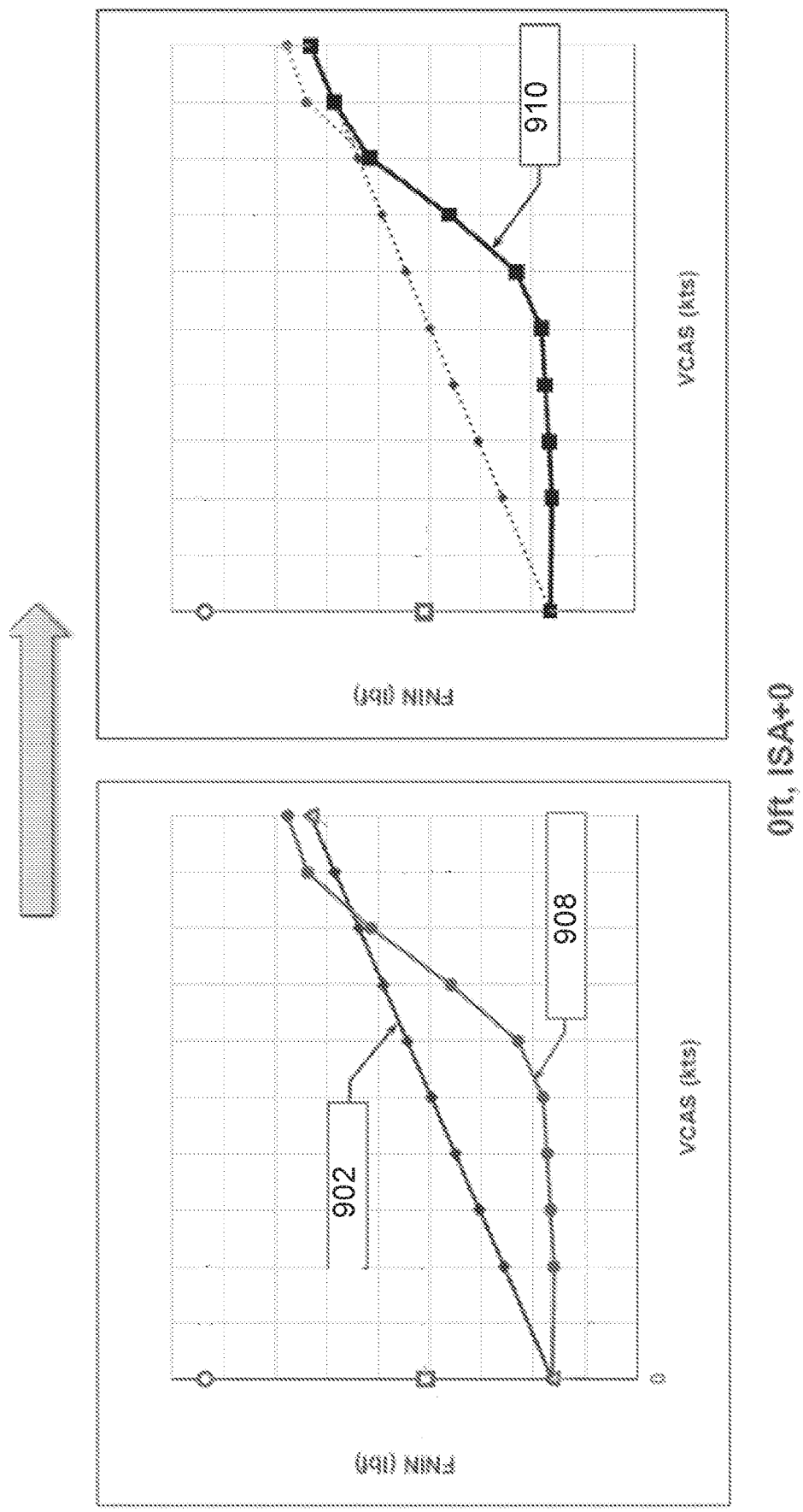
FIG. 9B is an example of a thrust limitation requirement curve below a given speed threshold, in accordance with the embodiment of FIG. 8.
Figure 9C:
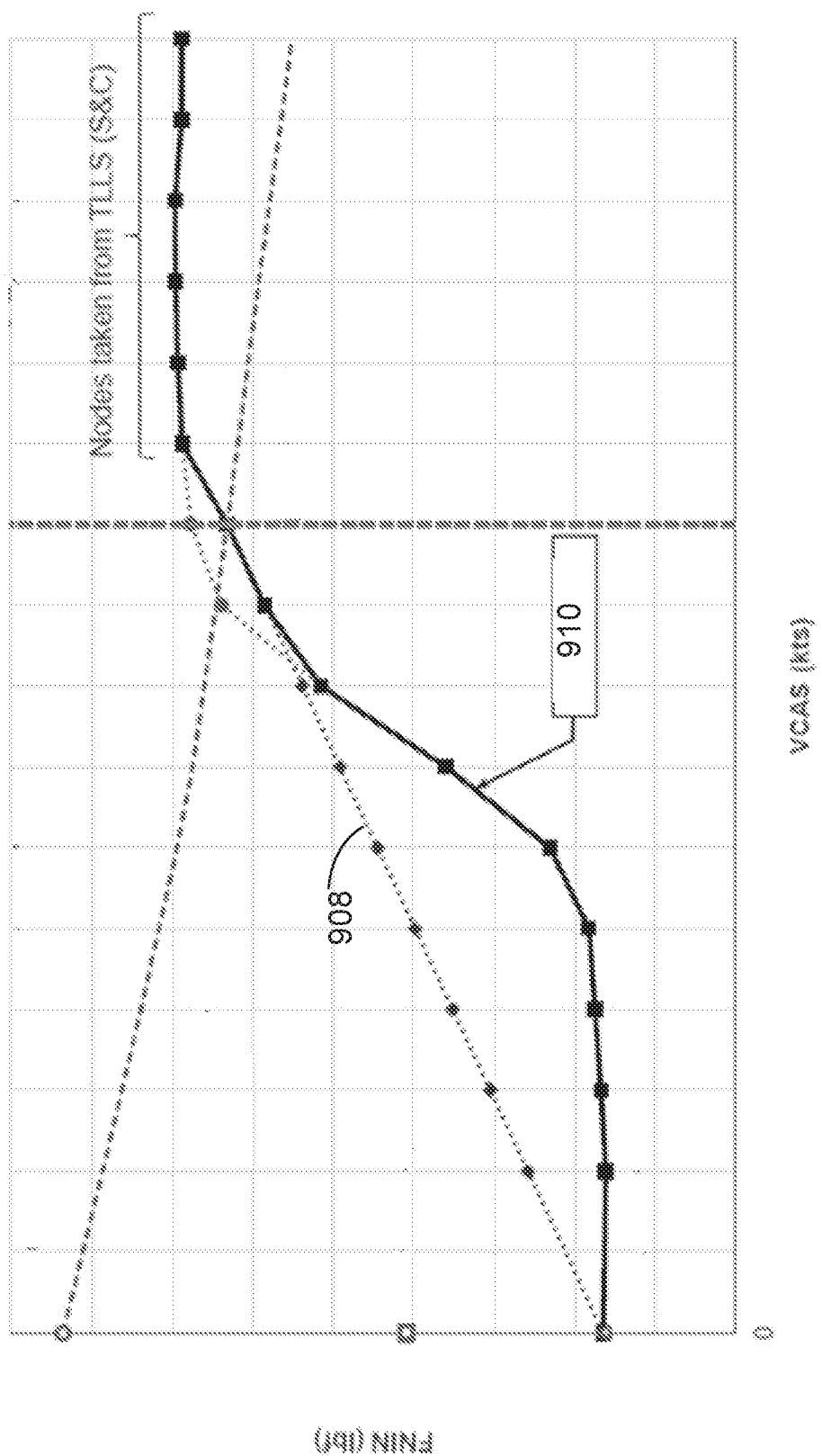
FIG. 9C is an example of a thrust limitation requirement curve below and above a given speed threshold, in accordance with the embodiment of FIG. 8.

FIG. 9A illustrates an example graph 900 of a linear ramp 902, in accordance with one embodiment. The linear ramp 902 is defined from the lowest thrust value among a plurality of thrust values 904. In particular, the lowest thrust value among the thrust value $904_1$ at the maximum allowable static thrust (e.g. 83% N1), the maximum takeoff reference value $904_2$ at 0 knots, and the thrust limitation requirement $904_3$ is used as the starting point for the linear ramp 902. In the example of FIG. 9A, the lowest thrust value is the maximum allowable static thrust value $904_1$ and the linear ramp 902 is defined starting from the thrust value $904_1$ to the maximum takeoff reference thrust value 906 at the given threshold (e.g. 50 knots). As can be seen in FIG. 9A, using the linear ramp 902 allows to attenuate the sharp ramp-up that is present in the thrust limitation requirement curve 908. While the CAS is below the given threshold, the linear ramp 902 is compared at each speed node to the thrust limitation requirement curve 908 and the lowest value at each node is used to define the new thrust limitation requirement curve 910, as illustrated in FIG. 9B. As can be seen in FIG. 9C, when the CAS is above the given threshold and less than or equal to the low speed threshold, the new thrust limitation requirement curve 910 follows the thrust limitation requirement curve 908 at each speed node.

It should be understood that, in some embodiments, the takeoff thrust limit may be set as a function of additional parameters including, but not limited to, a weight of the aircraft, a center of gravity of the aircraft, a wind amplitude, and/or a wind direction. In particular, the takeoff thrust limitation functionality may be disabled, adjusted or modulated if the aircraft weight, the center of gravity, the wind amplitude, and/or the wind direction exceed a predetermined tolerance.

Figure 10:
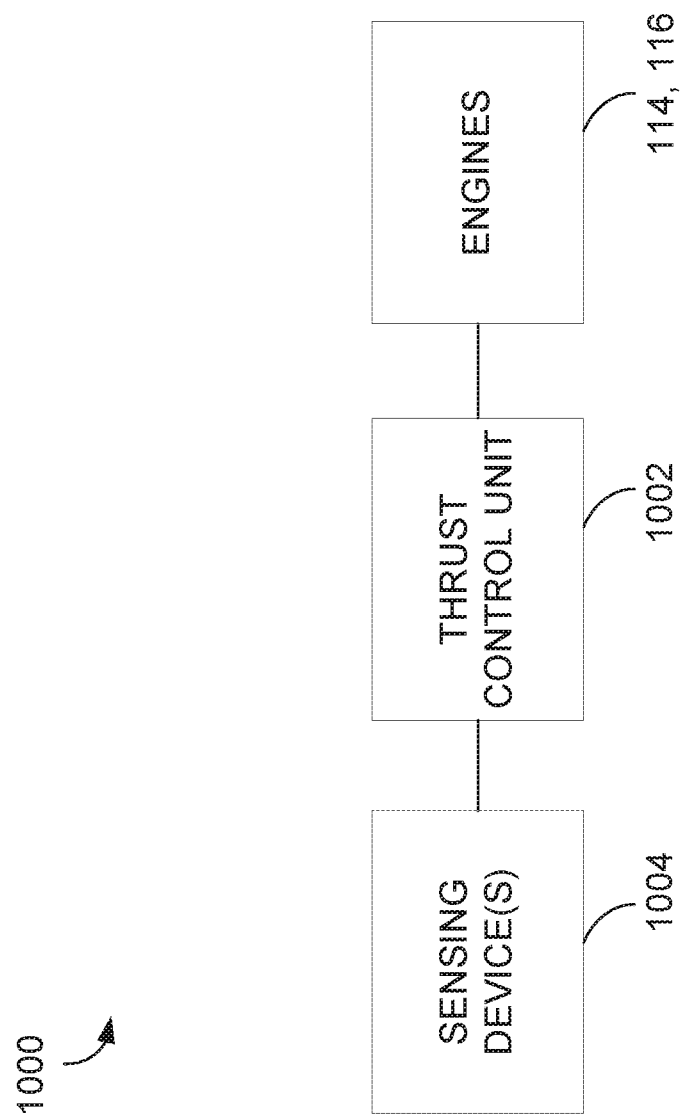
FIG. 10 is a block diagram of an example system for controlling a takeoff thrust of an aircraft, in accordance with one embodiment.

Referring now to FIG. 10, a system 1000 for controlling a takeoff thrust of an aircraft will now be described. The system 1000 illustratively comprises a thrust control unit 1002, which is illustratively implemented in the FADEC (not shown). The thrust control unit 1002 is in communication with the hardware of the engines 114, 116 for controlling an operation thereof, particularly controlling the level of thrust generated by the engines 114, 116. The thrust control unit 10002 may for this purpose receive one or more inputs from one or more sensing devices 1004, such as aircraft and engine sensors, and output one or more control signals to the engines 114, 116. It should be understood that the thrust control unit 1002 may also receive input(s) from other suitable devices as well as from the cockpit (e.g. pilot command(s)).

Figure 11:
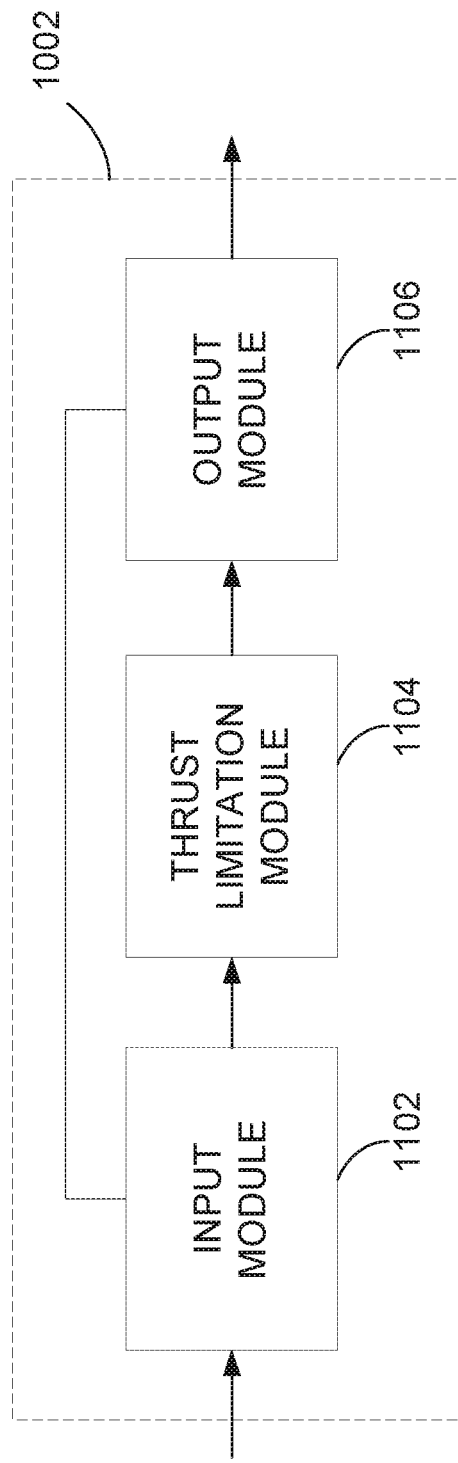
FIG. 11 is a block diagram of the thrust control unit of FIG. 8, in accordance with one embodiment.

Referring now to FIG. 11, the thrust control unit 1002 illustratively implements the methods described above with reference to FIG. 2 to FIG. 9C and comprises an input module 1102, a thrust limitation module 1104, and an output module 1106. The input module 1102 illustratively receives input data (e.g. the input(s) from the sensing device(s) 1004) including, but not limited to, an aircraft type, an aircraft speed, an ambient temperature, an ambient pressure, and/or an indication of whether the aircraft is on the ground or in flight. Upon receiving the input data, the input module 1102 may determine whether the inputs to be used by the thrust limitation module 1104 are received and valid. The input module 1102 may also determine from the input data whether the aircraft is on the ground and whether the CAS is below a given low speed threshold (e.g. 80 knots), as discussed above. If these conditions are not satisfied, the input module 1102 may cause the thrust limitation functionality to be disabled and provide a corresponding indication to the output module 1106 for output to any suitable device (e.g. an aircraft display, or the like). For example, an indication that the received inputs are invalid and that the thrust limitation functionality is therefore disabled may be provided. Upon determining that the conditions are satisfied, the input module 1102 may transmit the input data to the thrust limitation module 1104 for computation of the takeoff thrust limit.

The thrust limitation module 1104 illustratively uses the input data received from the input module 1102 to compute the takeoff thrust limit according to the methods described above. In particular and as discussed above with reference to FIG. 4 and FIG. 5, the thrust limitation module 1104 illustratively determines (e.g. using the ADSP CAS when the latter is above the given threshold, e.g. 50 knots, or estimating the CAS based on wheel speed when the ADSP CAS is below the second threshold, e.g. 30 knots) the speed value to be used as input to query the takeoff thrust limitation requirement tables stored in memory. As discussed above with reference to FIG. 6 and FIG. 7, in one embodiment, the thrust limitation module 1104 then sets the thrust limit value by selecting the lowest thrust value between the selected takeoff thrust and the thrust limitation requirement obtained upon querying the thrust limitation table(s). As discussed above with reference to FIG. 8 to FIG. 9C, in another embodiment, the thrust limitation module 1104 sets the thrust limit value by using the thrust limitation requirement at each speed node when the aircraft speed is below the given threshold and otherwise by selecting the lowest thrust at each speed node among the thrust limitation requirement and the linear ramp from the lowest thrust at static to the maximum takeoff reference. The thrust limitation module 1104 then applies the takeoff thrust limit value to the N1 command and sends a corresponding control signal to the output module 1106 for rendering on any suitable output device (e.g. an aircraft display). For example, the output module 11006 may cause for a command cursor, which is indicative of the takeoff thrust limit and therefore of where the takeoff thrust level is capped, to be displayed along with the N1 command.

Figure 12:
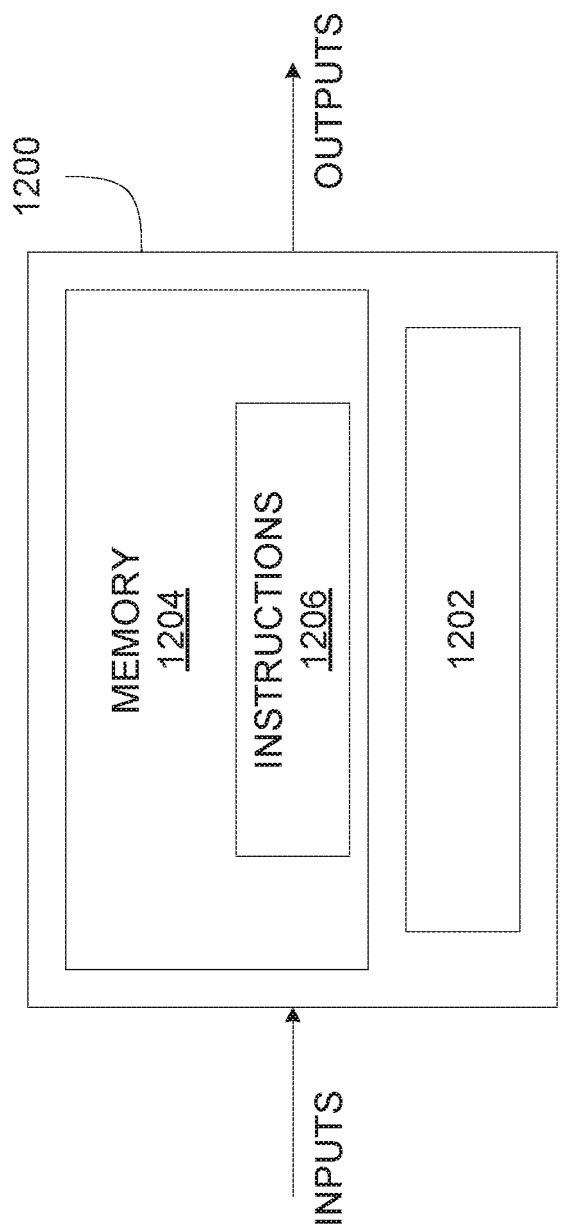
FIG. 12 is a block diagram of an example computing device for implementing the thrust control unit, in accordance with one embodiment.

With reference to FIG. 12, the thrust control unit (reference 1002 of FIG. 10) may be implemented by a computing device 1200, comprising a processing unit 1202 and a memory 1204 which has stored therein computer-executable instructions 1206. The processing unit 1202 may comprise any suitable devices configured to cause a series of steps to be performed so as to implement the methods described herein such that instructions 1206, when executed by the computing device 1200 or other programmable apparatus, may cause the functions/acts/steps specified in the methods described herein to be executed. The processing unit 1202 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 1204 may comprise any suitable known or other machine-readable storage medium. The memory 1204 may comprise non-transitory computer readable storage medium such as, for example, but not limited to, an electronic, magnetic, optical, electromagnetic, infrared, or semiconductor system, apparatus, or device, or any suitable combination of the foregoing. The memory 1204 may include a suitable combination of any type of computer memory that is located either internally or externally to device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory 1204 may comprise any storage means (e.g., devices) suitable for retrievably storing the computer-executable instructions 1206 executable by processing unit 1202.

The methods and systems described herein may be implemented in a high level procedural or object oriented programming or scripting language, or a combination thereof, to communicate with or assist in the operation of a computer system, for example the computing device 1200. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems disclosed herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A method for controlling a thrust produced at takeoff by at least one engine of an aircraft, the method comprising:
receiving at least one input signal comprising input data indicative of a speed of the aircraft, the at least one input signal comprising a speed signal from a speed probe indicative of one of a calibrated airspeed, a true airspeed, and a ground speed of the aircraft;
comparing the speed of the aircraft to a first predetermined threshold; and
responsive to determining that the speed is below the first predetermined threshold, determining from the input data a thrust limit for the at least one engine and outputting to the at least one engine a thrust limitation signal for causing the thrust to be limited according to the thrust limit,
wherein receiving the at least one input signal comprises receiving from a wheel speed sensor a wheel speed signal indicative of a wheel speed for the aircraft,
the method further comprising:
comparing the one of the calibrated airspeed, the true airspeed, and the ground speed to a second predetermined threshold;
responsive to determining that the one of the calibrated airspeed, the true airspeed, and the ground speed is above the second predetermined threshold, setting the one of the calibrated airspeed, the true airspeed, and the ground speed, as the speed of the aircraft; and
responsive to determining that the one of the calibrated airspeed, the true airspeed, and the ground speed is below the second predetermined threshold, computing an estimated speed of the aircraft on the basis of the wheel speed and setting the estimated speed as the speed of the aircraft.

2. The method of claim 1, wherein the wheel speed signal is received as comprising a plurality of wheel speed values and further wherein computing the estimated speed comprises determining a valid wheel speed value among the plurality of wheel speed values and computing a sum of the valid wheel speed value and a wind adjustment value.

3. The method of claim 1, wherein receiving the at least one input signal comprises receiving an indication of a type of the aircraft, a measurement of an ambient temperature, and a measurement of an ambient pressure and further wherein determining the thrust limit comprises selecting a lowest one of a commanded takeoff thrust value and a predetermined thrust limitation value selected from a table providing thrust as a function of at least one of the speed of the aircraft, the type of the aircraft, the ambient temperature, and the ambient pressure.

4. The method of claim 1, wherein receiving the at least one input signal comprises receiving an indication of a type of the aircraft, a measurement of an ambient temperature, and a measurement of an ambient pressure and further wherein determining the thrust limit comprises:
comparing the speed of the aircraft to a third predetermined threshold;
responsive to determining that the aircraft speed is above the third predetermined threshold, setting as the thrust limit a first predetermined thrust limitation value, the first thrust limitation value associated with the speed of the aircraft and selected from a table providing thrust as a function of at least one of the speed of the aircraft, the type of the aircraft, the ambient temperature, and the ambient pressure; and
responsive to determining that the aircraft speed is below the third predetermined threshold, setting as the thrust limit a lowest value among the first thrust limitation value and a thrust value selected from a linear ramp defined from a lowest thrust value at static to a maximum takeoff thrust reference at the third predetermined threshold, the lowest thrust value at static corresponding to a minimum value among a maximum allowable static thrust, a maximum takeoff thrust reference at zero knots, and a second predetermined thrust limitation value, the second thrust limitation value selected from the table and associated with a speed of zero knots.

5. The method of claim 4, wherein comparing the speed of the aircraft to the first predetermined threshold comprises comparing the speed to 80 knots and further wherein comparing the speed of the aircraft to the third predetermined threshold comprises comparing the speed to 50 knots.

6. The method of claim 1, further comprising disabling the thrust limitation signal from being output to the at least one engine responsive to determining that the current speed is above the first predetermined threshold.

7. The method of claim 1, wherein the at least one input signal is indicative of whether the aircraft is on ground, the method further comprising disabling the thrust limitation signal from being output to the at least one engine responsive to determining from the at least input signal that the aircraft is not on ground.

8. The method of claim 1, further comprising disabling the thrust limitation signal from being output to the at least one engine responsive to determining that the at least one input signal is invalid.

9. The method of claim 1, wherein the at least one input signal is indicative of at least one of a weight of the aircraft, a center of gravity of the aircraft, a wind amplitude, and a wind direction, the method further comprising disabling the thrust limitation signal from being output to the at least one engine or modulating the thrust limitation signal responsive to determining that at least one of the weight of the aircraft, the center of gravity of the aircraft, the wind amplitude, and the wind direction exceeds a predetermined tolerance.

10. A system for controlling a thrust produced at takeoff by at least one engine of an aircraft, the system comprising:
a processing unit; and
a non-transitory computer-readable memory having stored thereon program instructions executable by the processing unit for:
receiving at least one input signal comprising input data indicative of a speed of the aircraft, the at least one input signal comprising a speed signal from a speed probe indicative of one of a calibrated airspeed, a true airspeed, and a ground speed of the aircraft;
comparing the speed of the aircraft to a first predetermined threshold; and
responsive to determining that the speed is below the first predetermined threshold, determining from the input data a thrust limit for the at least one engine and outputting to the at least one engine a thrust limitation signal for causing the thrust to be limited according to the thrust limit,
wherein receiving the at least one input signal comprises receiving from a wheel speed sensor a wheel speed signal indicative of a wheel speed for the aircraft,
the program instructions further executable by the processing unit for:
comparing the one of the calibrated airspeed, the true airspeed, and the ground speed to a second predetermined threshold;

responsive to determining that the one of the calibrated airspeed, the true airspeed, and the ground speed is above the second predetermined threshold, setting the one of the calibrated airspeed, the true airspeed, and the ground speed, as the speed of the aircraft; and responsive to determining that the one of the calibrated airspeed, the true airspeed, and the ground speed is below the second predetermined threshold, computing an estimated speed of the aircraft on the basis of the wheel speed and setting the estimated speed as the speed of the aircraft.

11. The system of claim 10, wherein the program instructions are executable by the processing unit for receiving the wheel speed signal comprising a plurality of wheel speed values and for computing the estimated speed comprising determining a valid wheel speed value among the plurality of wheel speed values and computing a sum of the valid wheel speed value and a wind adjustment value.

12. The system of claim 10, wherein the program instructions are executable by the processing unit for receiving the at least one input signal comprising receiving an indication of a type of the aircraft, a measurement of an ambient temperature, and a measurement of an ambient pressure and for determining the thrust limit comprising selecting a lowest one of a commanded takeoff thrust value and a predetermined thrust limitation value selected from a table providing thrust as a function of at least one of the speed of the aircraft, the type of the aircraft, the ambient temperature, and the ambient pressure.

13. The system of claim 10, wherein the program instructions are executable by the processing unit for receiving the at least one input signal comprising receiving an indication of a type of the aircraft, a measurement of an ambient temperature, and a measurement of an ambient pressure and for determining the thrust limit comprising:

comparing the speed of the aircraft to a third predetermined threshold;

responsive to determining that the aircraft speed is above the third predetermined threshold, setting as the thrust limit a first predetermined thrust limitation value, the first thrust limitation value associated with the speed of the aircraft and selected from a table providing thrust as a function of at least one of the speed of the aircraft, the type of the aircraft, the ambient temperature, and the ambient pressure; and responsive to determining that the aircraft speed is below the third predetermined threshold, setting as the thrust limit a lowest value among the first thrust limitation value and a thrust value selected from a linear ramp defined from a lowest thrust value at static to a maximum takeoff thrust reference at the third predetermined threshold, the lowest thrust value at static corresponding to a minimum value among a maximum allowable static thrust, a maximum takeoff thrust reference at zero knots, and a second predetermined thrust limitation value, the second thrust limitation value selected from the table and associated with a speed of zero knots.

14. The system of claim 13, wherein the program instructions are executable by the processing unit for comparing the speed of the aircraft to the first predetermined threshold comprising comparing the speed to 80 knots and for comparing the speed of the aircraft to the third predetermined threshold comprising comparing the speed to 50 knots.

15. The system of claim 10, wherein the program instructions are executable by the processing unit for disabling the thrust limitation signal from being output to the at least one engine responsive to determining that the current speed is above the first predetermined threshold.

16. The system of claim 10, wherein the program instructions are executable by the processing unit for receiving the at least one input signal indicative of whether the aircraft is on ground and for disabling the thrust limitation signal from being output to the at least one engine responsive to determining from the at least input signal that the aircraft is not on ground.

17. The system of claim 10, wherein the program instructions are executable by the processing unit for disabling the thrust limitation signal from being output to the at least one engine responsive to determining that the at least one input signal is invalid.

18. The system of claim 10, wherein the program instructions are executable by the processing unit for receiving the at least one input signal indicative of at least one of a weight of the aircraft, a center of gravity of the aircraft, a wind amplitude, and a wind direction and for disabling the thrust limitation signal from being output to the at least one engine or modulating the thrust limitation signal responsive to determining that at least one of the weight of the aircraft, the center of gravity of the aircraft, the wind amplitude, and the wind direction exceeds a predetermined tolerance.

* * * * *